US008429899B2

(12) United States Patent
Gonze et al.

(10) Patent No.: US 8,429,899 B2
(45) Date of Patent: Apr. 30, 2013

(54) TARGET PARTICULATE MATTER FILTER REGENERATION AND TEMPERATURE CONTROL SYSTEM

(75) Inventors: Eugene V. Gonze, Pinckney, MI (US); Halim G. Santoso, Novi, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 245 days.

(21) Appl. No.: 12/852,744

(22) Filed: Aug. 9, 2010

(65) Prior Publication Data

US 2012/0031072 A1   Feb. 9, 2012

(51) Int. Cl.
   *F01N 3/00*   (2006.01)
(52) U.S. Cl.
   USPC .................................. 60/285; 60/289; 60/311
(58) Field of Classification Search .................. 60/285, 60/286, 295, 289, 311
   See application file for complete search history.

(56) References Cited

U.S. PATENT DOCUMENTS

| 7,243,488 | B2* | 7/2007 | Bonadies et al. | 60/295 |
|---|---|---|---|---|
| 8,297,046 | B2* | 10/2012 | Bandl-Konrad et al. | 60/297 |
| 2001/0052232 | A1* | 12/2001 | Hoffmann et al. | 60/285 |
| 2003/0167756 | A1* | 9/2003 | Szymkowicz | 60/289 |
| 2004/0103654 | A1* | 6/2004 | Ohtake et al. | 60/295 |
| 2007/0130923 | A1* | 6/2007 | Dye et al. | 60/295 |
| 2008/0060350 | A1* | 3/2008 | Ament et al. | 60/295 |
| 2009/0235644 | A1* | 9/2009 | Wu et al. | 60/285 |
| 2011/0072788 | A1* | 3/2011 | Ruona et al. | 60/276 |

* cited by examiner

*Primary Examiner* — Thomas Denion
*Assistant Examiner* — Patrick Maines

(57) ABSTRACT

A regeneration system includes a particulate matter (PM) filter loading module that determines a current soot loading level of a PM filter. A PM filter temperature module determines a temperature of the PM filter. An exhaust flow rate module determines an exhaust flow rate of the PM filter. A control module deactivates an air pump of an air pump circuit and operates an engine within a predetermined range of stoichiometry based on the current soot loading, the temperature and the exhaust flow rate.

18 Claims, 6 Drawing Sheets

US 8,429,899 B2

TARGET PARTICULATE MATTER FILTER REGENERATION AND TEMPERATURE CONTROL SYSTEM

FIELD

The present disclosure relates to regeneration of particulate matter filters of an exhaust system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines produce particulate matter (PM) that is filtered from exhaust gas by a PM filter. The PM filter is disposed in an exhaust system of the engine. The PM filter reduces emission of PM that is generated during combustion. Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy.

As one example, an exhaust system may include a three-way catalyst converter (TWC), an oxidation catalyst (OC) and a particulate matter (PM) filter located downstream from an engine. Exhaust gas from the engine passes through the TWC, followed by the OC and then is filtered by the PM filter. The TWC reduces nitrogen oxides NOx, oxidizes carbon monoxide (CO) and oxidizes unburnt hydrocarbons (HC) and volatile organic compounds. The OC oxides CO remaining in the exhaust received from the TWC.

Continuing from the above example, spark of the engine may be retarded to heat up the engine and thus the exhaust system to initiate regeneration of the PM filter. The PM filter may be heated to a PM combustion temperature of, for example, 600-750° C. The increased temperatures of exhaust system components can decrease the operating life of the TWC and/or the OC. Also, an increased amount of fuel is required to provide this heating.

SUMMARY

A regeneration system is provided and includes a particulate matter (PM) filter loading module that determines a current soot loading level of a PM filter. A PM filter temperature module determines a temperature of the PM filter. An exhaust flow rate module determines an exhaust flow rate of the PM filter. A control module deactivates an air pump of an air pump circuit and operates an engine within a predetermined range of stoichiometry based on the current soot loading, the temperature and the exhaust flow rate.

In other features, a regeneration method includes receiving an exhaust gas via an upstream end of a particulate matter (PM) filter of an exhaust system of an engine. Ambient air is directed to a first exhaust conduit upstream from the PM filter via an air pump. A current soot loading level of the PM filter is determined. A temperature of the PM filter is determined. An exhaust flow rate of the PM filter is determined. The air pump is deactivated. The engine is operated within a predetermined range of stoichiometry based on the current soot loading, the temperature and the exhaust flow rate.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
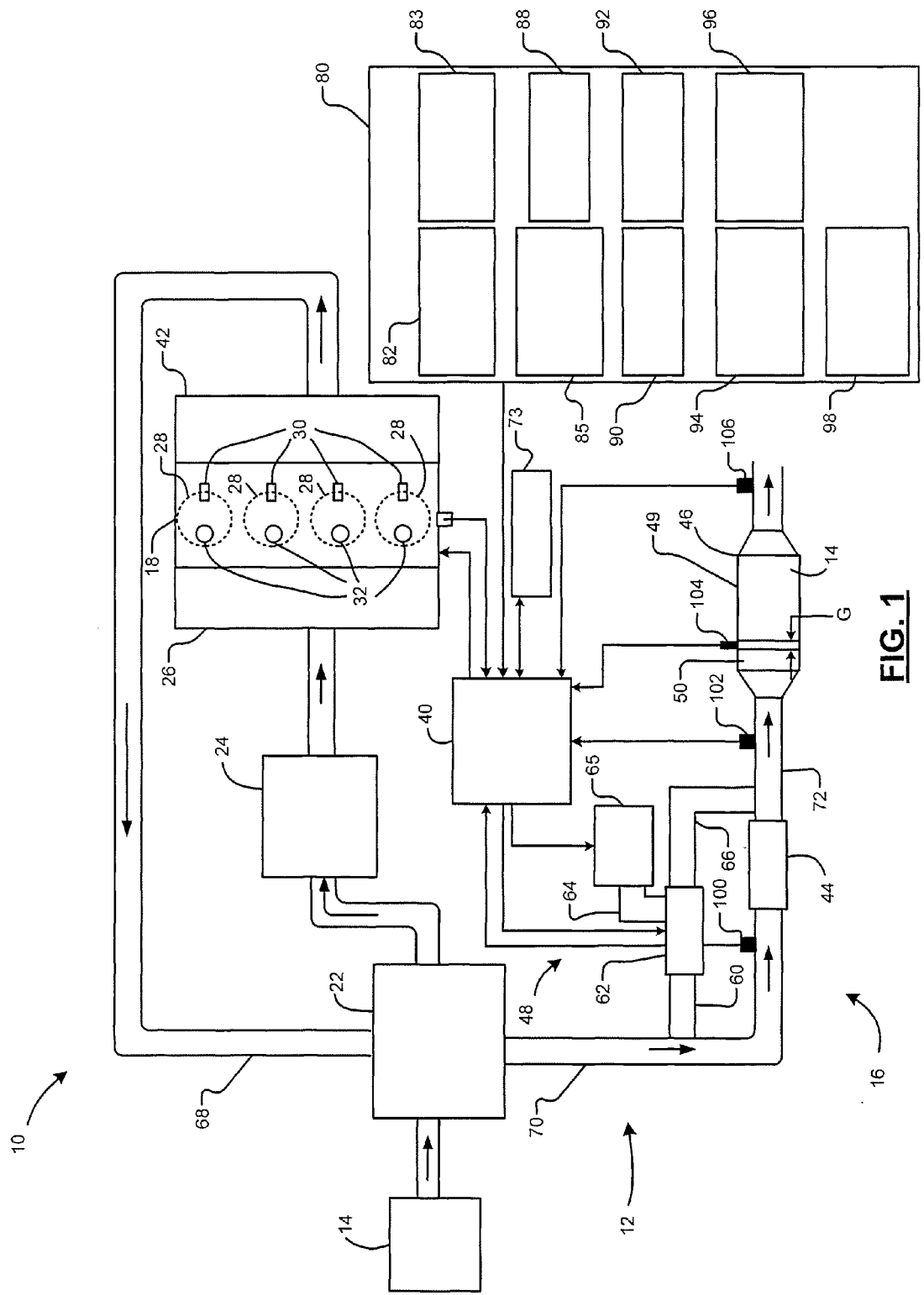
FIG. 1 is a functional block diagram of an engine system incorporating a regeneration system in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an application specific integrated circuit (ASIC); an electronic circuit; a combinational logic circuit; a field programmable gate array (FPGA); a processor (shared, dedicated, or group) that executes code; or a combination of some or all of the above, such as in a system-on-chip.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An exhaust system may include a particulate matter (PM) filter located downstream from an engine. Exhaust gas from the engine is filtered by the PM filter. During regeneration, the PM filter may be heated to a PM combustion temperature by providing an increase in fuel to the engine. In the following disclosure, implementations are described that include increasing regeneration temperatures while reducing regeneration times. PM oxidation correlates exponentially with temperature. For this reason, the greater the regeneration temperature the faster PM burns. Reduced regeneration times, reduces fuel consumption associated with regeneration. The reduced regeneration times are provided while maintaining integrity of a PM filter.

In FIG. 1, an engine system 10 that includes a regeneration system 12 is shown. The regeneration system 12 thermally targets a particulate matter (PM) filter 14 of an exhaust system 16 during regeneration by controlling heating of the PM filter 14. The regeneration system 12 minimizes regeneration times while preventing thermal runaway of the PM filter 14 during regeneration. Thermal runaway can occur during certain operating conditions. A thermal runaway can occur, for example, when: PM filter loading is greater than a predetermined loading; temperature of the PM filter 14 is greater than a predetermined temperature; and/or exhaust flow rate in the exhaust system 16 is less than a predetermined exhaust flow rate. Thermal runaway refers to when the temperature of the PM filter 14 exceeds a degradation temperature associated with degrading the PM filter 14. The degradation temperature may be approximately, for example, 1200-1300° C. This is described further below.

The engine system 10 may be a hybrid electric vehicle system, a plug-in hybrid electric vehicle system, a start/stop vehicle system, a partial zero emissions vehicle (PZEV) system, a super ultra low emissions vehicle (SULEV) system or other stricter emissions vehicle system (e.g., SULEV20), etc. The engine system 10 includes an engine 18 and the exhaust system 16. Although the engine 18 is shown as a spark ignition (gasoline or petroleum based) engine, the engine 18 is provided as an example. The regeneration system 12 may be implemented on various other engines, such as diesel engines.

The engine 18 combusts an air and fuel mixture to produce drive torque. Air enters the engine 18 by passing through an air filter 20. Air passes through the air filter 20 and may be drawn into a turbocharger 22. The turbocharger 22 when included compresses the fresh air. The greater the compression, the greater the output of the engine 18. The compressed air passes through an air cooler 24 when included before entering an intake manifold 26.

Air within the intake manifold 26 is distributed into cylinders 28. Fuel is injected into the cylinders 28 by fuel injectors 30. Spark plugs 32 ignite air/fuel mixtures in the cylinders 28. Combustion of the air/fuel mixtures creates exhaust. The exhaust exits the cylinders 28 into the exhaust system 16.

The regeneration system 12 includes the exhaust system 16 and an engine control module (ECM) 40. The exhaust system 16 includes the ECM 40, an exhaust manifold 42, a first three-way converter (TWC) 44, a 4-way converter (FWC) 46 and an air pump circuit 48. Optionally, an EGR valve (not shown) re-circulates a portion of the exhaust back into the intake manifold 26. The remainder of the exhaust is directed into the turbocharger 22 to drive a turbine. The turbine facilitates the compression of the fresh air received from the air filter 20. Exhaust flows from the turbocharger 22 through the first TWC 44 and into the FWC 46.

The first TWC 44 reduces nitrogen oxides NOx, oxidizes carbon monoxide (CO) and oxidizes unburnt hydrocarbons (HC) and volatile organic compounds. The first TWC 44 oxidizes the exhaust based on the post combustion air/fuel ratio. The amount of oxidation increases the temperature of the exhaust.

The FWC 46 includes the PM filter 14, a housing 49, an oxidation catalyst (OC) (closed coupled catalyst) and/or a second TWC 50. The PM filter 14 and the second TWC 50 are disposed within the housing 49 and have respective upstream and downstream ends. The second TWC 50 may by in contact with the PM filter 14 or may be separated from the PM filter 14 by a gap G to alter flow of exhaust between the PM filter 14 and the second TWC 50. The second TWO 50 also oxides CO remaining in the exhaust received from the first TWC 44 to generate $CO_2$. The second TWC 50 may also reduce nitrogen oxides NOx and oxidize unburnt hydrocarbons (HC) and volatile organic compounds. The PM filter 14 receives exhaust from the second TWC 50 and filters soot particulates present in the exhaust.

The air pump circuit 48 includes a first air conduit 60, an air valve 62, a second air conduit 64, an air pump 65, and a third air conduit 66. The first air conduit 60 is connected between the exhaust manifold 42 and the air valve 62. The first air conduit 60 may be directly connected to the exhaust manifold 42 or to an exhaust conduit upstream from the first TWC 44, such as to an exhaust conduit 68 between the exhaust manifold 42 and the turbo 22 or to an exhaust conduit 70 between the turbo 22 and the first TWC 44. The second air conduit 64 is connected between the air valve 62 and the air pump 65. The third air conduit 66 is connected between the air valve 62 and the FWC 46. The third air conduit 66 may be connected to an exhaust conduit 72 between the first TWC 44 and the FWC 46.

The air valve 62 has two operating positions and corresponding modes. During the first mode, the air valve 62 is in a first position. The first mode may be referred to as a cold start mode. Ambient air is directed to the first air conduit 60 using the air pump 65 when in the first mode. The ambient air may be directed to the exhaust manifold 42 and/or exhaust valves of the engine 18.

During a second mode, the air valve 62 is in a second position. The second mode may be referred to as a regeneration mode or a rich operating mode. During the regeneration mode and the rich operating mode, ambient air is directed into the third air and/or exhaust conduits 66, 72 using the air pump 65.

The ECM 40 controls the engine 18, the position of the air valve 62, the air pump 65, and PM filter regeneration based on various sensed information and soot loading. More specifically, the ECM 40 estimates loading of the PM filter 14. When the estimated loading is at a predetermined regeneration level $S_R$ and/or a pressure differential $P_{PF}$ across the PM filter 14 is greater than a predetermined pressure, operation of the engine 18, position of the air valve 62, and state of the air pump 65 are controlled to initiate the regeneration process. The duration of the regeneration process may be varied based upon the estimated amount of PM within the PM filter 14.

During regeneration, the engine 18 is operated in the rich mode and ambient air is directed to the third air and exhaust conduits 66, 72 to heat the second TWC 50 up to regeneration temperatures. The engine 18 may be operated in the rich mode and ambient air may be directed to the third air and exhaust conduits 66, 72 based on a timer 73. The timer 73 may be part of the ECM 40 or may be a separate timer, as shown. The remainder of the regeneration process is achieved using the heat generated by the heated exhaust passing through the PM filter 14.

During regeneration, the heating of the PM filter 14 is performed without increasing temperatures of the engine 18 and/or components of the exhaust system 16 upstream from the PM filter 14 above normal operating temperatures (e.g., 93-121° C. for an engine and 200-300° C. for exhaust system components upstream from a PM filter).

The above system may include sensors 80 for determining exhaust flow levels, exhaust temperature levels, exhaust pressure levels, oxygen levels, intake air flow rates, intake air pressure, intake air temperature, engine speed, EGR, etc. Exhaust flow sensors 82, exhaust temperature sensors 83, exhaust pressure sensors 85, oxygen sensor 88, an EGR sensor 90, an intake air flow sensor 92, an intake air pressure sensor 94, an intake air temperature sensor 96, and an engine speed sensor 98 are shown.

A first exhaust flow, pressure and/or temperature sensor 100 may be connected to the first air conduit 60 and upstream from the first TWC 44. A second exhaust flow, pressure and/or temperature sensor 102 may be connected to the exhaust conduit 72 and between the first TWC 44 and the FWC 46. A third exhaust flow, pressure and/or temperature sensor 104 may be connected to the FWC 46. The third exhaust sensor 104 may detect temperature of exhaust, for example, in the gap G. A fourth exhaust flow, pressure and/or temperature sensor 106 may be connected downstream of the FWC 46. The control module 40 may operate the engine 18 and the exhaust system 16 in the cold start mode, the rich mode, and the regeneration mode based on the information from the sensors 80 and the first, second and third sensors 100, 102, 104, 106. The second and fourth sensors 102, 106 may be used to detect inlet and outlet flow rates of the PM filter 14.

Figure 2:
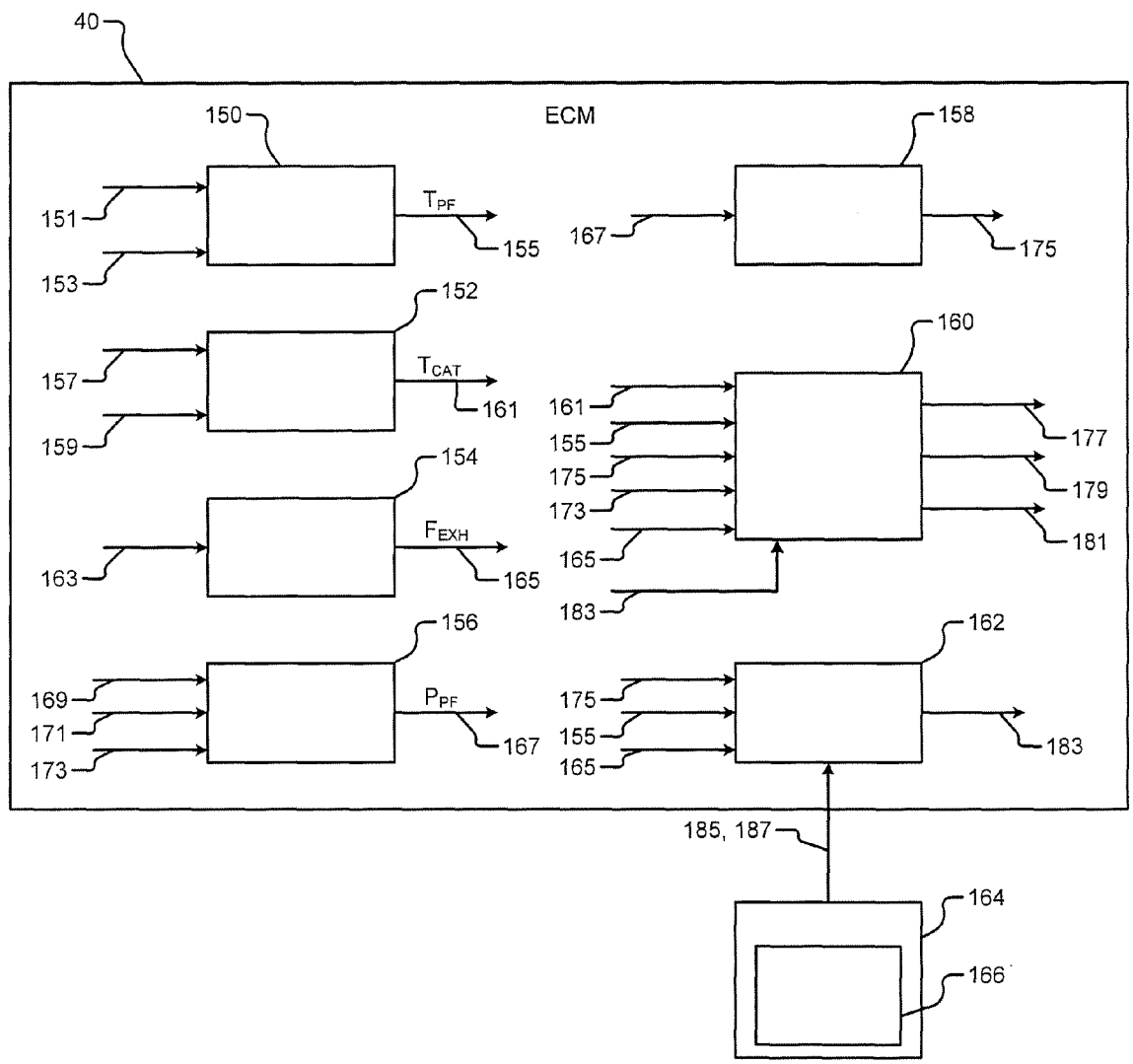
FIG. 2 is a functional block diagram of an engine control module in accordance with the present disclosure.

Referring now also to FIG. 2, the ECM 40 is shown. The ECM 40 includes a PM filter temperature module 150, a catalyst temperature module 152, an exhaust flow rate module 154, a PM filter pressure module 156, a PM filter loading module 158, a regeneration module 160 and a runaway prevention module 162. The PM filter temperature module 150 monitors temperatures of the PM filter 14. The PM filter temperature module 150 may receive, for example, inlet and outlet temperature signals $T_{PFIN}$ (151), $T_{PFOUT}$ (153) from PM filter temperature sensors, such as the sensors 104, 106. The PM filter temperature module 150 may generate a PM filter temperature signal $T_{PF}$ (155) based on the inlet and outlet temperature signals $T_{PFIN}$, $T_{PFOUT}$.

The catalyst temperature module 152 may monitor temperatures of one or more of the TWC 44 and the TWC 50. The catalyst temperature module 152 may receive first and second catalyst temperature signals $T_{CAT1}$ (157), $T_{CAT2}$ (159) indicating temperatures of the TWC 44 and the TWC 50. The catalyst temperature module 152 may generate a catalyst temperature signal $T_{CAT}$ (161) based on the first and second catalyst temperature signals $T_{CAT1}$, $T_{CAT2}$.

The exhaust flow rate module 154 monitors flow rate of exhaust gas in the exhaust system 16. The exhaust flow rate module 154 may receives exhaust flow rate signals $F_{1-N}$ (163) from exhaust flow rate sensors, such as the sensors 100, 102, 104, 106, where N is an integer. The exhaust flow rate module 154 may generate an exhaust flow rate signal $F_{EXH}$ (165) based on the exhaust flow rate signals $F_{1-N}$.

The PM filter pressure module 156 may determine a pressure differential $P_{PF}$ (167) across the PM filter 14. The pressure differential $P_{PF}$ may be determined based on an inlet flow rate signal $F_{IN}$ (169), an outlet flow rate signal $F_{OUT}$ (171), and an engine speed signal ENG (173). The inlet flow rate signal $F_{IN}$ and the outlet flow rate signal $F_{OUT}$ may be generated by, for example, the sensors 104, 106. The exhaust flow rate signals $F_{1-N}$ may include the flow rate signals $F_{IN}$, $F_{OUT}$. The pressure differential $P_{PF}$ may be determined based on a difference between inlet and outlet pressures of the PM filter 14, which may be provided by the, for example, the sensors 104, 106.

The PM filter loading module 158 estimates soot loading $S_I$ (175) of the PM filter 14. The PM filter loading module 158 may estimate soot loading $S_I$ based on parameters, such as vehicle mileage, exhaust pressure, exhaust drop off pressure across the PM filter (e.g., the pressure differential $P_{PF}$), by a predictive method, etc. Mileage refers to vehicle mileage, which approximately corresponds to or can be used to estimate vehicle engine operating time and/or the amount of exhaust gas generated. As an example, regeneration may be performed when a vehicle has traveled approximately 200-300 miles. The amount of soot generated depends upon vehicle operation over time. At idle speeds less soot is generated than when operating at travel speeds. The amount of exhaust gas generated is related to the state of soot loading in the PM filter.

Exhaust pressure can be used to estimate the amount of exhaust generated over a period of time. When an exhaust pressure exceeds a predetermined pressure threshold or when an exhaust pressure decreases below a predetermined pressure threshold, regeneration may be performed. For example when exhaust pressure entering a PM filter exceeds a predetermined pressure threshold, regeneration may be performed. As another example when exhaust pressure exiting a PM filter is below a predetermined pressure threshold, regeneration may be performed.

Exhaust drop off pressure may be used to estimate the amount of soot in a PM filter. For example, as the drop off pressure increases the amount of soot loading increases. The exhaust drop off pressure may be determined by determining pressure of exhaust entering a PM filter minus pressure of exhaust exiting the PM filter. Exhaust system pressure sensors may be used to provide these pressures.

The predictive method may include the determination of one or more engine operating conditions, such as engine load, fueling schemes (patterns, volumes, etc.), fuel injection timing, and an exhaust gas recirculation (EGR) level. A cumulative weighting factor may be used based on the engine conditions. The cumulative weighting factor is related to soot loading. When the cumulative weighting factor exceeds a threshold, regeneration may be performed.

The regeneration module 160 controls regeneration including initiating, pausing and stopping or ending regeneration based on various parameters. For example, the regeneration module 160 may control regeneration based on the PM filter temperature signal $T_{PF}$, the catalyst temperature signal $T_{CAT}$, the exhaust flow rate signal $F_{EXH}$, the engine speed signal ENG, the soot loading $S_I$, etc. The regeneration module 160 may generate an air pump signal AIRPUMP (177), a fuel control signal FUEL (179), and/or a spark control signal SPARK (181) based on the parameters. The air pump signal AIRPUMP activates and deactivates the air pump 65.

The runaway prevention module 162 monitors various parameters and determines when a thermal runaway condition exists. A thermal runaway condition refers to when certain parameters values are such that a thermal runaway can occur. A thermal runaway condition may be determined based on, for example, the soot loading $S_I$, the PM filter temperature signal $T_{PF}$, and the exhaust flow rate signal $F_{EXH}$. The greater the soot loading, the higher the temperature of the PM filter 14 and/or the lower the flow rate of the PM filter 14, the more likely that the PM filter 14 will exhibit a thermal runaway event during regeneration. The runaway prevention module 162 may monitor the soot loading $S_I$, the PM filter temperature signal $T_{PF}$, and the exhaust flow rate signal $F_{EXH}$ and prevent the PM filter 14 from exhibiting a thermal runaway event based on these parameters.

The runaway prevention module 162 generates a regeneration pause signal PAUSE (183) to pause regeneration when a thermal runaway condition exists. The regeneration module 160 pauses regeneration based on the pause signal PAUSE. The regeneration pause signal PAUSE may also indicate when to continue regeneration. This may occur when the thermal runaway condition no longer exists. Pausing regeneration may include deactivating the air pump 65 and operating the engine 18 at stoichiometry. Operating at stoichiometry decreases oxygen levels and stops CO and HC regeneration fueling.

In one implementation, the runaway prevention module 162 may compare the soot loading $S_I$, the PM filter temperature signal $T_{PF}$, and the exhaust flow rate signal $F_{EXH}$ to predetermined soot loading, temperature and exhaust flow thresholds $S_{Th}$, $T_{Th}$, and $F_{Th}$ (collectively 185). The runaway prevention module 162 may signal the regeneration module 160 to pause regeneration when: the soot loading $S_I$ is greater than the soot loading threshold $S_{Th}$; the PM filter temperature signal $T_{PF}$ is greater than the temperature threshold $T_{Th}$; and the exhaust flow rate signal $F_{EXH}$ is less than the exhaust flow rate threshold $F_{Th}$.

The thresholds $S_{Th}$, $T_{Th}$, and $F_{Th}$ may not be fixed values and may be adjusted based on the soot loading $S_I$, the PM filter temperature signal $T_{PF}$ and the exhaust flow rate signal $F_{EXH}$. For example, the temperature threshold $T_{Th}$ may be decreased and/or the exhaust flow rate threshold $F_{Th}$ may be increased when the soot loading $S_I$ increases beyond the soot loading threshold $S_{Th}$. As another example, the soot loading threshold $S_I$ and the temperature threshold $T_{Th}$ may be decreased when the exhaust flow rate signal $F_{EXH}$ decreases beyond the exhaust flow rate threshold $F_{Th}$. As yet another example, the soot loading threshold $S_I$ may be decreased and the exhaust flow rate threshold $F_{Th}$ may be increased when the PM filter temperature signal $T_{PF}$ increases beyond the temperature threshold $T_{Th}$.

In another implementation, the runaway prevention module 162 looks up a prevention value PREV (187) in a runaway prevention table 164 based on the soot loading $S_I$, the PM filter temperature signal $T_{PF}$, and the exhaust flow rate signal $F_{EXH}$. The runaway prevention table 164 is stored in memory 166. The runaway prevention module 162 determines whether regeneration should be paused and generates the regeneration pause signal PAUSE based on the prevention value PREV. In yet another implementation, the runaway prevention module 162 may generate the pause signal PAUSE based on a function of parameters including the soot loading $S_I$, the PM filter temperature signal $T_{PF}$, and the exhaust flow rate signal $F_{EXH}$.

Figure 3:
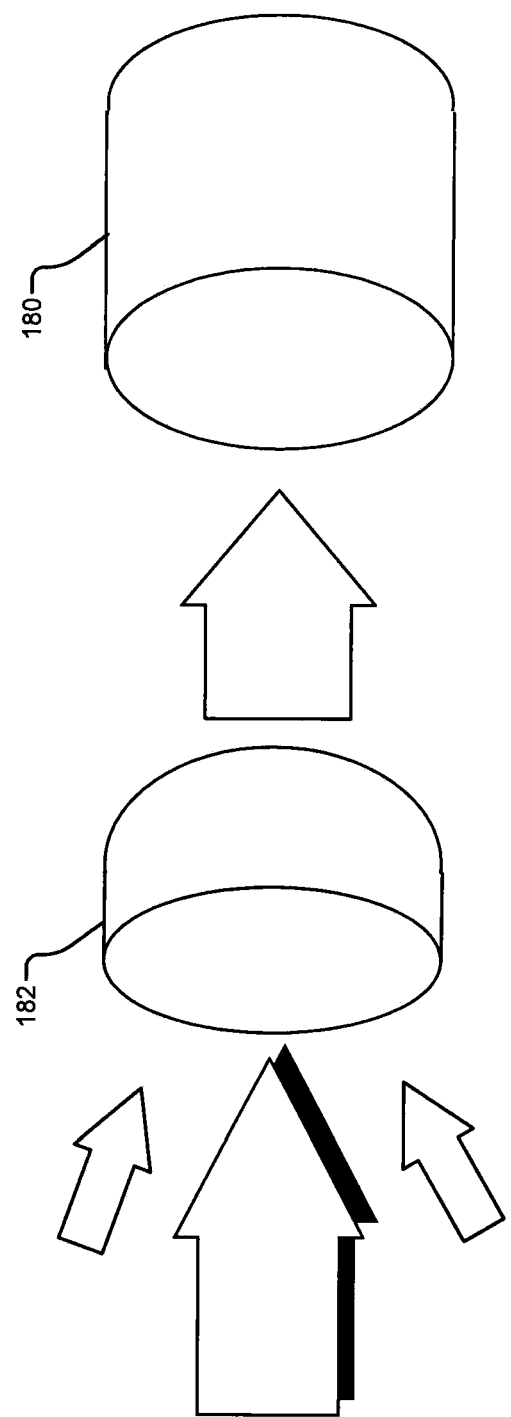
FIG. 3 is an exothermic exhaust diagram in accordance with the present disclosure.

In FIG. 3, an exothermic exhaust diagram is shown. To initiate a regeneration of particulates in a PM filter 180, an engine may be operated in the rich mode. The rich mode refers to operating the engine at an air/fuel ratio that is richer than a stoichiometric ratio. Oxygen within an exhaust system is reduced when an engine is operated in the rich mode. Since the oxygen level in the exhaust system is reduced, ambient air is pumped into the exhaust system to allow the OC 182 in, for example, a FWC to convert CO to carbon dioxide ($CO_2$). This conversion causes temperature of the OC 182 to increase.

The OC 182 receives thermal energy and exhaust gases, which include combustion products, such as hydrogen ($H_2$), hydrocarbons (HC), and carbon monoxide (CO), from the engine. The OC 182 also receives oxygen ($O_2$) from an air pump. The OC 182 oxidizes the CO and HC and increases in temperature, which initiates a large exothermic reaction that passes to the PM filter 180 and travels along the PM filter 180 while burning PM in the PM filter 180. Temperature of the OC 182 is increased to a regeneration temperature. A quick converter light off provides reduced cold start emissions.

The implementations disclosed herein provide a quick ramp up in temperature of a PM filter to a HIGH regeneration temperature that is greater than a minimum regeneration temperature. This decreases regeneration time and reduces fuel consumption associated with regeneration. A minimum regeneration temperature refers to a minimum temperature at which PM of a PM filter 14 burns or ignites. An example minimum regeneration temperature is 350-600° C. depending on whether the PM filter 14 is catalyzed. In one implementation, the minimum regeneration temperature is approximately 600-600° C. A HIGH regeneration temperature may be, for example, 650-700° C. In another implementation, the HIGH regeneration temperature is greater than the minimum regeneration temperature and less than a degradation temperature (e.g., 1200-1300° C.) of the PM filter 14 by a predetermined safe range (e.g., 200-400° C.). The larger the regeneration temperature the quicker a regeneration process is performed.

Figure 4:
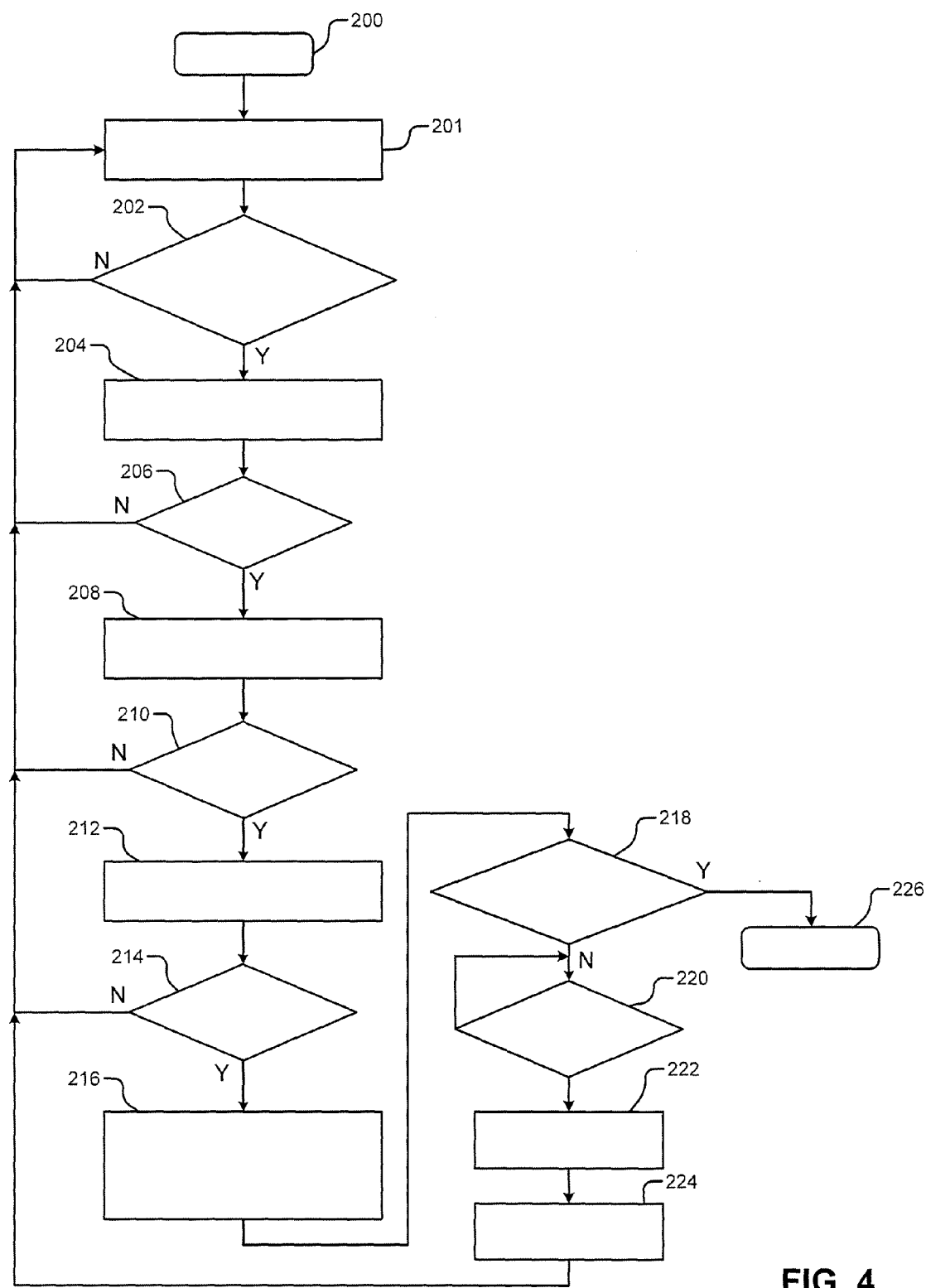
FIG. 4 is a logic flow diagram illustrating a regeneration monitoring and control method in accordance with the present disclosure.

In FIG. 4, a logic flow diagram illustrating cold start and regeneration methods is shown. Although the method is described primarily with respect to the engine system 10 and the ECM 40 of FIGS. 1-2, the method may be applied to other implementations of the present disclosure. The method may begin at 200. Below described control may be performed by the ECM 40 and/or by one or more of the modules of the ECM 40.

At 201, sensor signals are generated. The sensor signals may include exhaust flow signals, exhaust temperature signals, exhaust pressure signals, an oxygen signal, an intake air flow signal, an intake air pressure signal, an intake air temperature signal, an engine speed signal, an EGR signal, etc., which may be generated by the above-described sensors 80 and 100-106 of FIGS. 1 and 2.

At 202, the ECM 40 determines whether the regeneration mode of the PM filter 14 is active. Regeneration may be initiated using, for example, the method provided in FIGS. 5A and 5B. The engine 18 may be operated in the rich mode and the air pump 65 may be activated during regeneration. Task 204 is performed when the regeneration mode is active.

At 204, the PM filter loading module 158 estimates the soot loading $S_I$ of the PM filter 14, as described above. At 206, the runaway prevention module 162 determines whether the soot loading $S_I$ is greater than a predetermined soot loading threshold $S_{Th}$. The runaway prevention module 162 proceeds to 208 when the soot loading $S_I$ is greater than a predetermined threshold $S_{Th}$, otherwise returns to 201. The predetermined soot loading threshold $S_{Th}$ (second predetermined soot loading level) may be less than or equal to a predetermined threshold $S_R$ (first predetermined soot loading level) used to initiate regeneration. See task 312 of FIGS. 5A and 5B.

At 208, the PM filter temperature module 150 estimates temperature of the PM filter 14 and generates the PM filter temperature signal $T_{PF}$. At 210, the runaway prevention module 162 determines whether the PM filter temperature signal $T_{PF}$ is greater than the temperature threshold $T_{Th}$. The runaway prevention module 162 proceeds to 212 when the PM filter temperature signal $T_{PF}$ is greater than the temperature threshold $T_{Th}$, otherwise returns to 201.

At 212, the exhaust flow rate module 154 may estimate flow rate of the PM filter 14. The exhaust flow rate module 154 may generate the exhaust flow rate signal $F_{EXH}$ indicating the flow rate of the PM filter 14. At 214, the runaway prevention module 162 determines whether the exhaust flow rate signal $F_{EXH}$ is less than the exhaust flow rate threshold $F_{Th}$. The exhaust flow rate threshold $F_{Th}$ may be a predetermined threshold in cubic meters per second (m3/s) that is associated with, for example, an idle engine speed (e.g., 500-700 revolutions-per-minute (rpm)). An idle engine speed may occur, for example, when an accelerator of the engine 18 is not "tipped-in". As another example, the exhaust flow rate threshold $F_{Th}$ may be associated with a predetermine engine speed that is greater than an idle engine speed by a predetermined safe speed range (e.g., 50-200 rpm). The ECM 40 and/or the regeneration module 160 may proceed to 216 when the exhaust flow rate signal $F_{EXH}$ is less than the exhaust flow rate threshold $F_{Th}$, otherwise returns to 201.

During tasks 206, 210 and 214, the runaway prevention module 162 may determine whether to pause regeneration of the PM filter 14. Tasks 206, 210 and 214 may be performed during the same period. Tasks 206, 210 and 214 may be replaced with or performed along with a lookup task and/or a function task. The runaway prevention module 162 may lookup a prevention value PREV based on the soot loading $S_I$, the PM filter temperature signal $T_{PF}$, and the exhaust flow rate signal $F_{EXH}$ in the runaway prevention table 164 and generates the pause signal based on the prevention value PREV. The runaway prevention module 162 may generate the pause signal PAUSE based on a function of the soot loading $S_I$, the PM filter temperature signal $T_{PF}$, and the exhaust flow rate signal $F_{EXH}$. Task 216 is performed when regeneration is paused.

At 216, the regeneration module 160 pauses regeneration (PM filter protection mode). The regeneration module 160 and/or the ECM 40 may deactivate the air pump 65 and operate the engine 18 at stoichiometry (e.g., 14.7:1 air/fuel ratio) and/or within a predetermined range of stoichiometry. This can decrease the percentage of oxygen $O_2$ in the exhaust system 16 to approximately 0.5%, which prevents regeneration from continuing. Operating at stoichiometry reduces oxygen concentration within the exhaust system 16 and within the PM filter 14, which prevents regeneration from continuing. Reduced oxygen concentration levels, reduces temperature of the PM filter 14. This limits temperature spikes in the PM filter 14. Emissions performance, such as PZEV emission performance is maintained due to operation at stoichiometry.

At 218, the regeneration module 160 determines whether regeneration is completed. Task 220 is performed if regeneration is not completed. If regeneration is completed, control may return to 201, return to 310, (if performing the method of FIG. 5) or end at 226, as shown.

At 220, the runaway prevention module 162 determines whether the exhaust flow rate signal $F_{EXH}$ is greater than or equal to the exhaust flow rate threshold $F_{Th}$. The ECM 40 and/or the regeneration module 160 may proceed to 222 when the exhaust flow rate signal $F_{EXH}$ is greater than or equal to the exhaust flow rate threshold $F_{Th}$. Although task 220 includes checking if the exhaust flow rate signal $F_{EXH}$ is greater than or equal to the exhaust flow rate threshold $F_{Th}$, other parameter checks may be performed before proceeding to task 222. The parameter checks may include, for example, checking if (i) the soot loading of the PM filter 14 is greater than the soot loading threshold $S_{Th}$ and (ii) the temperature of the PM filter 14 $T_{PF}$ is greater than the temperature threshold $T_{Th}$.

At 222, the regeneration module 160 and/or the ECM 40 reactivates the air pump. At 224, the regeneration module 160 and/or the ECM 40 returns to operating the engine 18 in the rich mode. The ECM 40 may return to task 201 after task 224.

Figure 5A:
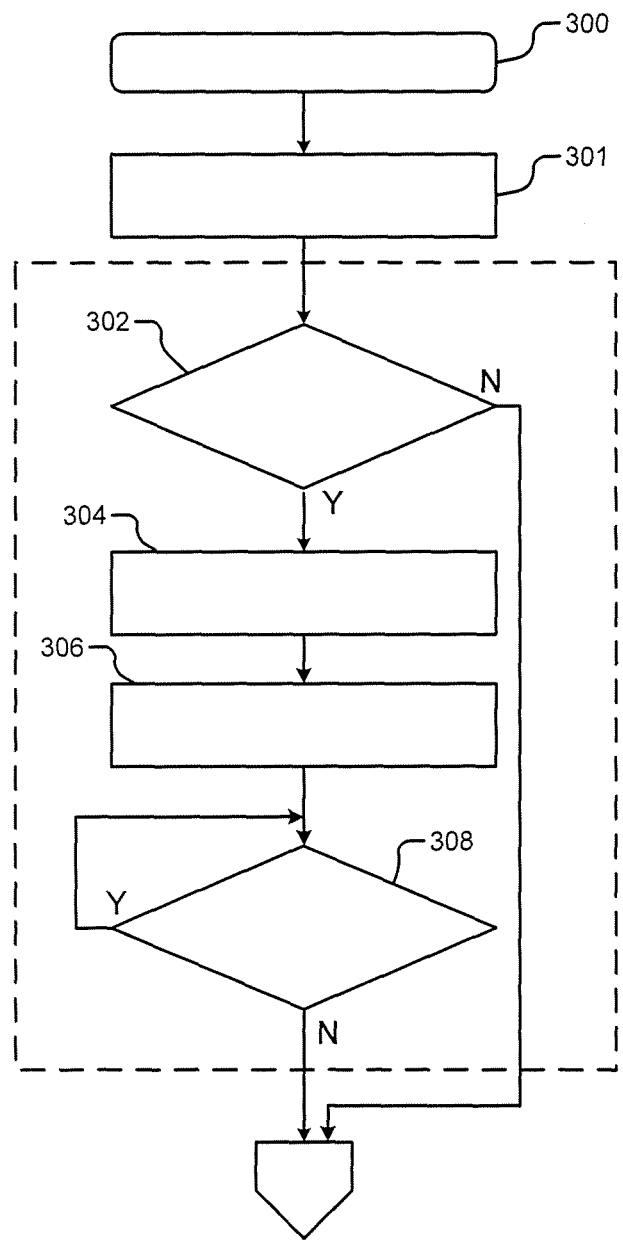
FIGS. 5A and 5B illustrate cold start and regeneration methods incorporating the regeneration monitoring and control method of FIG. 4 and in accordance with the present disclosure.
Figure 5B:
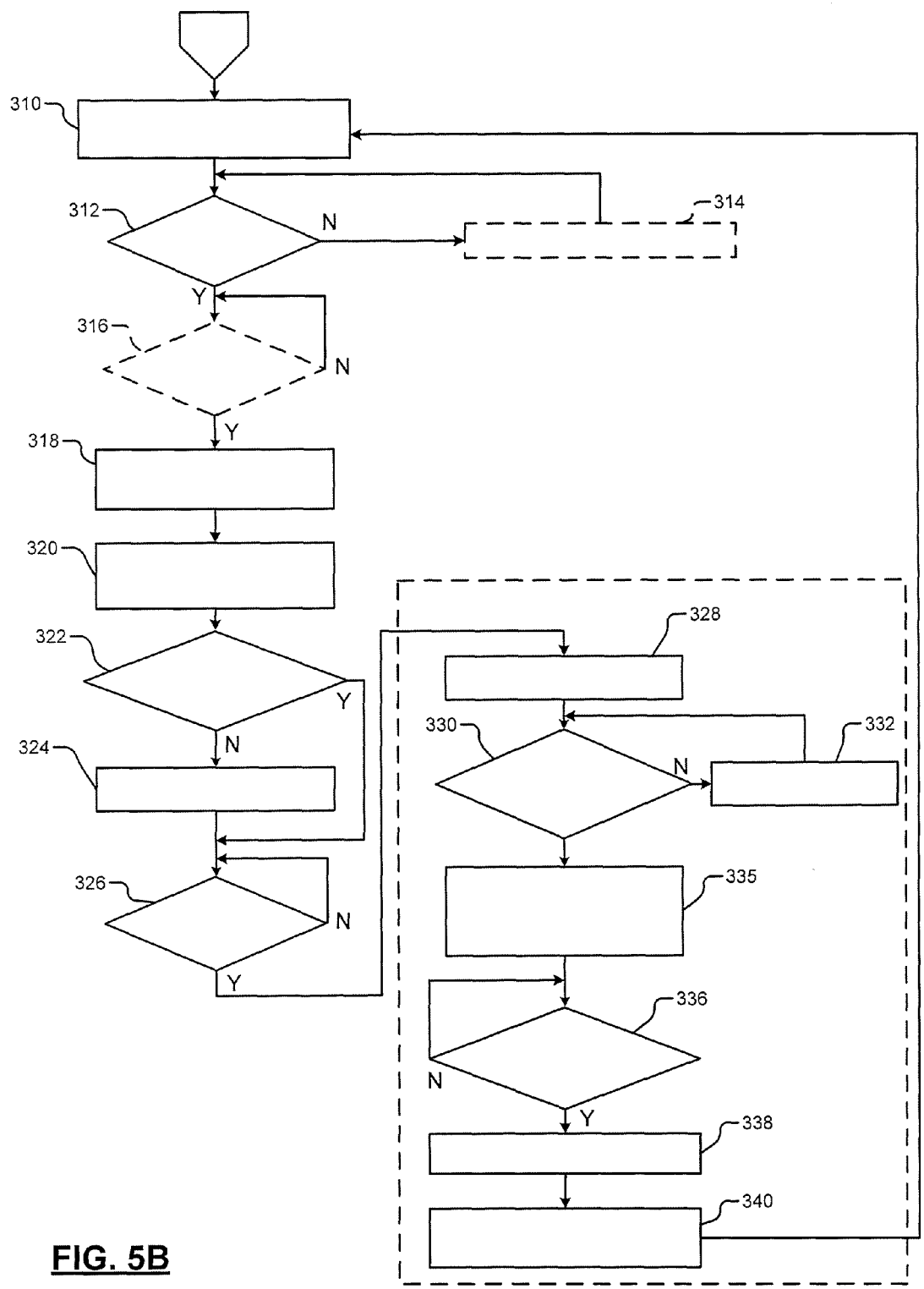

In FIGS. 5a and 5b, a logic flow diagram illustrating cold start and regeneration methods is shown. Although the method is described primarily with respect to the engine system 10 and the ECM 40 of FIGS. 1-2, the method may be applied to other implementations of the present disclosure. The method may begin at 300. Below described control may be performed by the ECM 40 and/or by one or more of the modules of the ECM 40.

At 301, sensor signals are generated. The sensor signals may include exhaust flow signals, exhaust temperature signals, exhaust pressure signals, an oxygen signal, an intake air flow signal, an intake air pressure signal, an intake air temperature signal, an engine speed signal, an EGR signal, etc., which may be generated by the above-described sensors 80 and 100-106 of FIGS. 1 and 2.

At 302, control determines whether the current temperature of the OC and/or FWC (e.g., the OC of the second TWC 50 and FWC 46) $T_{OC}$ is less than a CO exothermic temperature $T_{COEx}$ (first predetermined temperature). In one implementation, the CO exothermic temperature $T_{COEx}$ is 250° C. In another implementation, the CO exothermic temperature $T_{COEx}$ is 300° C. The temperature $T_{OC}$ may be determined, for example, based on information from the exhaust sensor 104 and/or using equations 1 and 2. $T_{Start}$ is the starting temperature of the OC and/or FWC. $E_{AddedMass}$ is the mass of, for example, the CO, $H_2$, and HC provided to the OC. HL is the heat loss of the OC. K is a constant. $F_E$ is exhaust flow, which may be a function of mass air flow and fuel quantity supplied to cylinders of an engine (e.g., cylinders 28). The mass air flow may be determined by a mass air flow sensor, such as the intake air flow sensor 92.

$$T_{OC} = T_{Start} + \{E_{AddedMass} - HL\} \quad (1)$$

$$HL = K_2 \times F_E \times T_{Inlet} \quad (2)$$

Control proceeds to 304 when the current temperature $T_{OC}$ is less than the CO exothermic temperature $T_{COEx}$, otherwise control proceeds to 310.

At 304, the air valve (e.g., the air valve 62) is positioned to the first position for an engine cold start. In the first position, air may pass from the air valve to the exhaust manifold (e.g., the exhaust manifold 42), but not from the air valve to a point downstream of the first TWC (e.g., the first TWC 44). At 306, the air pump (e.g., the air pump 65) is activated to pump air into the exhaust manifold.

At 308, control again determines whether the current temperature $T_{OC}$ is less than the CO exothermic temperature $T_{COEx}$. Control proceeds to 310 when the current temperature $T_{OC}$ is greater than or equal to the CO exothermic temperature $T_{COEx}$. Tasks performed at 302-308 allow temperature of the exhaust system to increase to normal operating temperatures. This quickly increases temperatures of the OCs of the exhaust system to temperatures for oxidization. The air pump may be deactivated when the current temperature $T_{OC}$ is greater than or equal to the CO exothermic temperature $T_{COEx}$.

At 310, control estimates soot loading of the PM filter, as described above. At 312, control determines whether the current soot loading $S_I$ is greater than a soot loading threshold $S_R$. Control proceeds to 316 when the current soot loading $S_I$ is greater than the lower threshold $S_R$, otherwise control proceeds to 314. At 314, control may deactivate the air pump if not deactivated after 308. At 316, control determines whether the current temperature $T_{OC}$ is greater than or equal to the CO exothermic temperature $T_{COEx}$. Control proceeds to 318 when the current temperature $T_{OC}$ is greater than or equal to the CO exothermic temperature $T_{COEx}$. Controls allows the OC and/or FWC to heat up to the CO exothermic temperature $T_{COEx}$ through normal operation of the engine (e.g., operating in the stoichiometric mode) and exhaust system (e.g. the air pump is deactivated).

At 318, control operates the engine in the rich mode to generate CO and HC. The rich mode is used to heat the OC and/or the FWC up to regeneration temperatures. The OC and/or the FWC oxidizes the CO and HC. The OC and/or FWC are increased in temperature, for example, from a normal operating temperature to a regeneration temperature.

At 320, control signals the air valve to switch to the second or regeneration position. At 322, control determines whether the air pump is activated. Control proceeds to 324 when the air pump is not activated. Control proceeds to 326 when the air pump is activated. At 324, the air pump is activated.

By operating the engine in the rich mode, the air valve in the second position and the air pump in the activated state, the regeneration system removes NOx via the first TWC and converts HC and CO via the second TWC. This is performed during regeneration of the PM filter. This reduces NOx and, HC and CO emissions during regeneration. Although the first TWC is oxygen deprived due to the engine operating in the rich mode, the oxygen is provided down stream from the first TWC to allow the OC of the FWC to oxidize received HC and CO.

At 326, control determines whether the current temperature $T_{OC}$ is greater than or equal to a PM exothermic temperature $T_{PMEx}$ (second predetermined temperature). Control allows the current temperature $T_{OC}$ to quickly increase or ramp up (within a predetermined period) to the PM exothermic temperature $T_{PMEx}$. Regeneration of the PM filter may begin when temperature of the OC, PM filter and/or FWC is greater than or equal to the PM exothermic temperature $T_{PMEx}$ for a predetermined period. The PM exothermic temperature (minimum temperature) of the OC, PM filter and/or FWC is obtained to start soot burning. For example only, the minimum temperature may be approximately 350-650° C. depending on whether the PM filter is catalyzed. Control proceeds to 328 when the current temperature $T_{OC}$ is greater than or equal to a PM exothermic temperature $T_{PMEx}$.

At 328, a timer is activated. The timer is used to determine whether the current temperature $T_{OC}$ is greater than or equal to a PM exothermic temperature $T_{PMEx}$ for the predetermined period.

At 330, control determines whether the current temperature $T_{OC}$ is greater than or equal to a PM exothermic temperature $T_{PMEx}$ for the predetermined period. Control proceeds to 335 when the timer is greater than or equal to the predetermined period, otherwise to 332. At 332, the timer is incremented.

At 335, the regeneration monitoring and control method of FIG. 4 may be initiated. The regeneration monitoring and control method of FIG. 4 may be performed while the regeneration mode is active (i.e. during regeneration of the PM filter 14). At 336, control determines whether regeneration is completed. Tasks 335 and 336 may be performed during the same period. Control proceeds to task 338 when regeneration is completed.

At 338 and 340, the air pump may be deactivated and the engine may be operated in a stoichiometric mode. The rich mode operation may be deactivated when a sufficient PM temperature is reached. The engine may operate in the rich mode only long enough for combustion of the soot and then may be returned to a stoichiometric operating mode. After 340, control may return to 310.

In use, the control module determines when the PM filter requires regeneration. The determination is based on soot levels within the PM filter. Alternately, regeneration can be performed periodically or on an event basis. The control module may estimate when the entire PM filter needs regeneration or when zones within the PM filter need regeneration.

The above-described tasks of FIGS. 4, 5A and 5B may be are meant to be illustrative examples; the tasks may be performed sequentially, synchronously, simultaneously, continuously, during overlapping time periods or in a different order depending upon the application.

The PM filter monitoring and regeneration control methods described above prevent thermal runaway events of a PM filter by removing exothermic fuel and reducing oxygen concentration levels, while minimizing fuel used in association with PM filter regeneration. The methods also maintain emissions control when regeneration is paused. Since the engine and thus the TWCs of the exhaust system are operated at stoichiometry, emissions control is maintained. The methods aid in maintaining PM filter integrity and durability over the life of a vehicle.

The targeted PM filter methods of the present disclosure minimize fuel used and the number of components that are increased in temperature during regeneration. This increases life of exhaust components, such as a TWO connected upstream of a housing of a PM filter. The targeted PM filter methods of the present disclosure include removal of NOx and conversion of HC and CO during regeneration of a PM filter.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A regeneration system comprising:
    a particulate matter (PM) filter loading module that determines a current soot loading level of a PM filter;
    a PM filter temperature module that determines a temperature of the PM filter;
    an exhaust flow rate module that determines an exhaust flow rate of the PM filter; and
    a control module that
        regenerates the PM filter and activates an air pump of an air pump circuit based on the current soot loading, the temperature and the exhaust flow rate;
        pauses regeneration of the PM filter, deactivates the air pump, and operates an engine within a predetermined range of stoichiometry
        based on the current soot loading and the temperature, and
        in response to the exhaust flow rate being less than a predetermined flow rate; and
        reactivates the air pump and operates the engine in a rich mode in response to the exhaust flow rate being greater than or equal to the predetermined flow rate to complete the regeneration of the PM filter.

2. The regeneration system of claim 1, further comprising:
    the PM filter, wherein the PM filter comprises an upstream end to receive exhaust gas from the engine; and
    the air pump circuit, wherein the air pump circuit directs ambient air to a first exhaust conduit upstream from the PM filter.

3. The regeneration system of claim 1, wherein the control module deactivates the air pump and operates the engine at stoichiometry when the current soot loading level is greater than a predetermined soot loading level.

4. The regeneration system of claim 1, wherein the control module deactivates the air pump and operates the engine at stoichiometry when the temperature is greater than a predetermined temperature.

5. The regeneration system of claim 1, wherein the control module deactivates the air pump and operates the engine at stoichiometry when:
   the current soot loading level is greater than a predetermined soot loading level; and
   the temperature is greater than a predetermined temperature.

6. The regeneration system of claim 1, further comprising a runaway prevention module that accesses memory to receive a prevention value based on the current soot loading level, the temperature and the exhaust flow rate,
   wherein the runaway prevention module generates a regeneration pause signal based on the prevention value, and
   wherein the control module deactivates the air pump and operates the engine at stoichiometry based on the pause signal.

7. The regeneration system of claim 1, wherein the control module:
   determines a temperature of an oxidation catalyst upstream from the PM filter;
   operates the engine in the rich mode and activates the air pump when the temperature of the oxidation catalyst is greater than a first predetermined temperature; and
   deactivates the air pump when the temperature of the PM filter is greater than a second predetermined temperature.

8. The regeneration system of claim 1, wherein the control module:
   activates the air pump and operates the engine in the rich mode when the current soot loading level is greater than a first predetermined soot loading level; and
   deactivates the air pump and operates the engine at stoichiometry when the current soot loading level is greater than a second predetermined soot loading level,
   wherein the second predetermined soot loading level is less than or equal to the first predetermined soot loading level.

9. The regeneration system of claim 1, wherein the control module activates the air pump and operates the engine in the rich mode when a pressure differential of the PM filter exceeds a predetermined pressure threshold.

10. The regeneration system of claim 9, wherein the pressure differential is equal to a difference between an inlet pressure and an outlet pressure of the PM filter.

11. The regeneration system of claim 1, wherein the air pump circuit comprises:
   the air pump;
   an air valve;
   a first air conduit that is connected between an exhaust manifold and the air valve;
   a second air conduit that is connected between the air pump and the air valve; and
   a third air conduit that is connected between the air valve and the PM filter.

12. An exhaust system comprising the regeneration system of claim 1 and further comprising:
   a 3-way converter connected between an exhaust manifold and the PM filter; and
   a 4-way converter comprising the PM filter and an oxidation catalyst, wherein the oxidation catalyst is connected between the 3-way converter and the PM filter.

13. A regeneration method comprising:
   receiving an exhaust gas via an upstream end of a particulate matter (PM) filter of an exhaust system of an engine;
   directing ambient air to a first exhaust conduit upstream from the PM filter via an air pump;
   determining a current soot loading level of the PM filter;
   determining a temperature of the PM filter;
   determining a first exhaust flow rate of the PM filter;
   regenerating the PM filter and activating the air pump of an air pump circuit based on the current soot loading, the temperature and the exhaust flow rate;
   pausing the regenerating of the PM filter, deactivating the air pump, and operating the engine within a predetermined range of stoichiometry
      based on the current soot loading the temperature, and
      in response to the first exhaust flow rate being less than a predetermined flow rate; and
   reactivating the air pump and operating the engine in a rich mode in response to the exhaust flow rate being greater than or equal to the predetermined flow rate to complete the regeneration of the PM filter.

14. The regeneration method of claim 13, wherein the deactivating of the air pump and the operating of the engine at stoichiometry is performed when:
   the current soot loading level is greater than a predetermined soot loading level; and
   the temperature is greater than a predetermined temperature.

15. The regeneration method of claim 14, further comprising:
   generating a prevention value based on the current soot loading level, the temperature and the first exhaust flow rate;
   generating a regeneration pause signal based on the prevention value; and
   deactivating the air pump and operating the engine at stoichiometry based on the pause signal.

16. The regeneration method of claim 13, further comprise:
   determining a temperature of an oxidation catalyst upstream from the PM filter;
   operating the engine in the rich mode and activating the air pump when the temperature of the oxidation catalyst is greater than a first predetermined temperature; and
   deactivating the air pump when the temperature of the PM filter is greater than a second predetermined temperature.

17. The regeneration method of claim 13, further comprising activating the air pump and operating the engine in the rich mode when the current soot loading level is greater than a first predetermined soot loading level,
   wherein the deactivating of the air pump and the operating of the engine at stoichiometry is performed when the current soot loading level is greater than a second predetermined soot loading level, and
   wherein the second predetermined soot loading level is less than or equal to the first predetermined soot loading level.

18. The regeneration method of claim 13, further comprising activating the air pump and operating the engine in the rich mode when a pressure differential of the PM filter exceeds a predetermined pressure threshold,
   wherein the pressure differential is equal to a difference between an inlet pressure and an outlet pressure of the PM filter.

* * * * *